(12) United States Patent
Austin

(10) Patent No.: US 11,219,337 B1
(45) Date of Patent: Jan. 11, 2022

(54) PORTABLE SINK ASSEMBLY

(71) Applicant: Matthew Austin, Springfield, OH (US)

(72) Inventor: Matthew Austin, Springfield, OH (US)

( * ) Notice: Subject to any disclaimer, the term of this patent is extended or adjusted under 35 U.S.C. 154(b) by 0 days.

(21) Appl. No.: 17/023,596

(22) Filed: Sep. 17, 2020

(51) Int. Cl.
    *A47K 1/02* (2006.01)
    *B60R 15/02* (2006.01)

(52) U.S. Cl.
    CPC ............... *A47K 1/02* (2013.01); *B60R 15/02* (2013.01)

(58) Field of Classification Search
    CPC .................................. A47K 1/02; B60R 15/02
    USPC ..................................... 4/625–626, 630, 678
    See application file for complete search history.

(56) References Cited

U.S. PATENT DOCUMENTS

| | | | |
|---|---|---|---|
| 4,201,415 A * | 5/1980 | Suchanek | B60K 11/00 180/68.1 |
| 5,301,376 A * | 4/1994 | Herbert | A47K 1/02 4/625 |
| 5,813,063 A * | 9/1998 | Watkins | E03C 1/18 4/626 |
| 6,161,228 A * | 12/2000 | Wietecha | A47K 1/02 4/625 |
| 7,249,464 B1 | 7/2007 | Watson | |
| 7,509,692 B2 | 3/2009 | Elkins | |
| 8,621,682 B2 * | 1/2014 | Maximilien | B60R 15/02 4/625 |
| 9,526,306 B2 | 12/2016 | Fitzgerald | |
| 9,854,897 B1 | 1/2018 | Pelkey, Jr. | |
| 2007/0075109 A1 | 4/2007 | McCrae | |
| 2011/0147427 A1 | 6/2011 | Weaver | |
| 2013/0092715 A1 | 4/2013 | Tayebi | |
| 2013/0298952 A1 | 11/2013 | Williams | |

* cited by examiner

*Primary Examiner* — Tuan N Nguyen

(57) ABSTRACT

A portable sink assembly for includes a cube that is positionable in a sleeper of a semi tractor be accessible to a driver. A sink is recessed into the cube to contain water and a faucet is removably coupled to the cube. The faucet is directed into the sink to direct the water into the sink. A pump is positioned in the cube, the pump is fluidly coupled between a water source and the faucet for pumping the water to the faucet. A valve is coupled to the pump and the valve is actuatable between a minimum flow rate and a maximum flow rate. In this way the valve adjusts the volume of water delivered to the pump between a minimum amount and a maximum amount thereby facilitating the flow rate of the faucet to be adjusted.

12 Claims, 7 Drawing Sheets

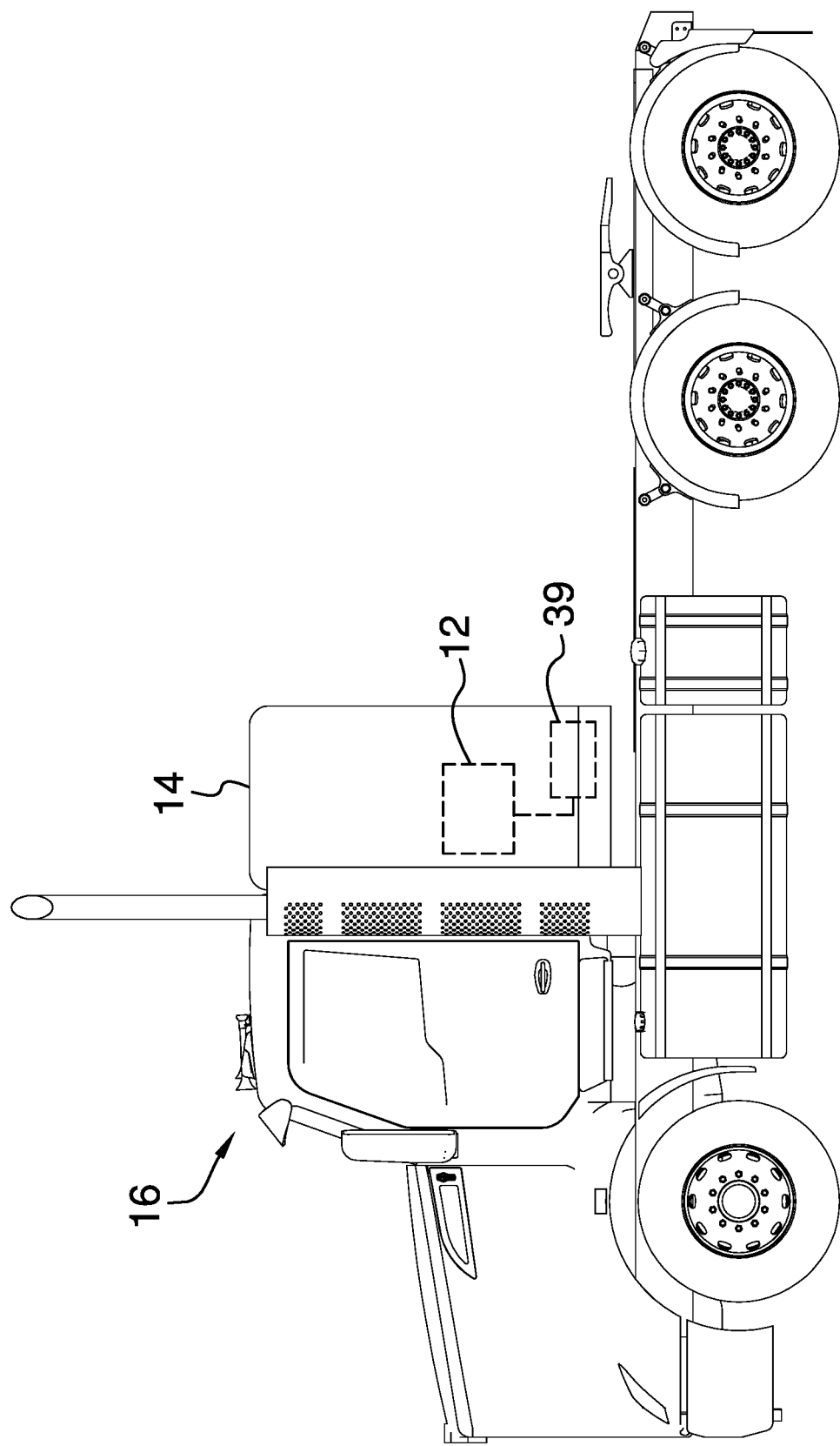

US 11,219,337 B1

PORTABLE SINK ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention

The disclosure relates to sink devices and more particularly pertains to a new sink device for facilitating running water in a semi tractor.

(2) Description of Related Art Including Information Disclosed Under 37 CFR 1.97 and 1.98

The prior art relates to sink devices including a variety of battery powered sinks that can be positioned in a vehicle. In each case of the prior art the sink devices include a faucet that has a flow control valve integrated therein.

BRIEF SUMMARY OF THE INVENTION

An embodiment of the disclosure meets the needs presented above by generally comprising a cube that is positionable in a sleeper of a semi tractor be accessible to a driver. A sink is recessed into the cube to contain water and a faucet is removably coupled to the cube. The faucet is directed into the sink to direct the water into the sink. A pump is positioned in the cube, the pump is fluidly coupled between a water source and the faucet for pumping the water to the faucet. A valve is coupled to the pump and the valve is actuatable between a minimum flow rate and a maximum flow rate. In this way the valve adjusts the volume of water delivered to the pump between a minimum amount and a maximum amount thereby facilitating the flow rate of the faucet to be adjusted.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 7 is a perspective in-use view of an embodiment of the disclosure.

DETAILED DESCRIPTION OF THE INVENTION

Figure 1:
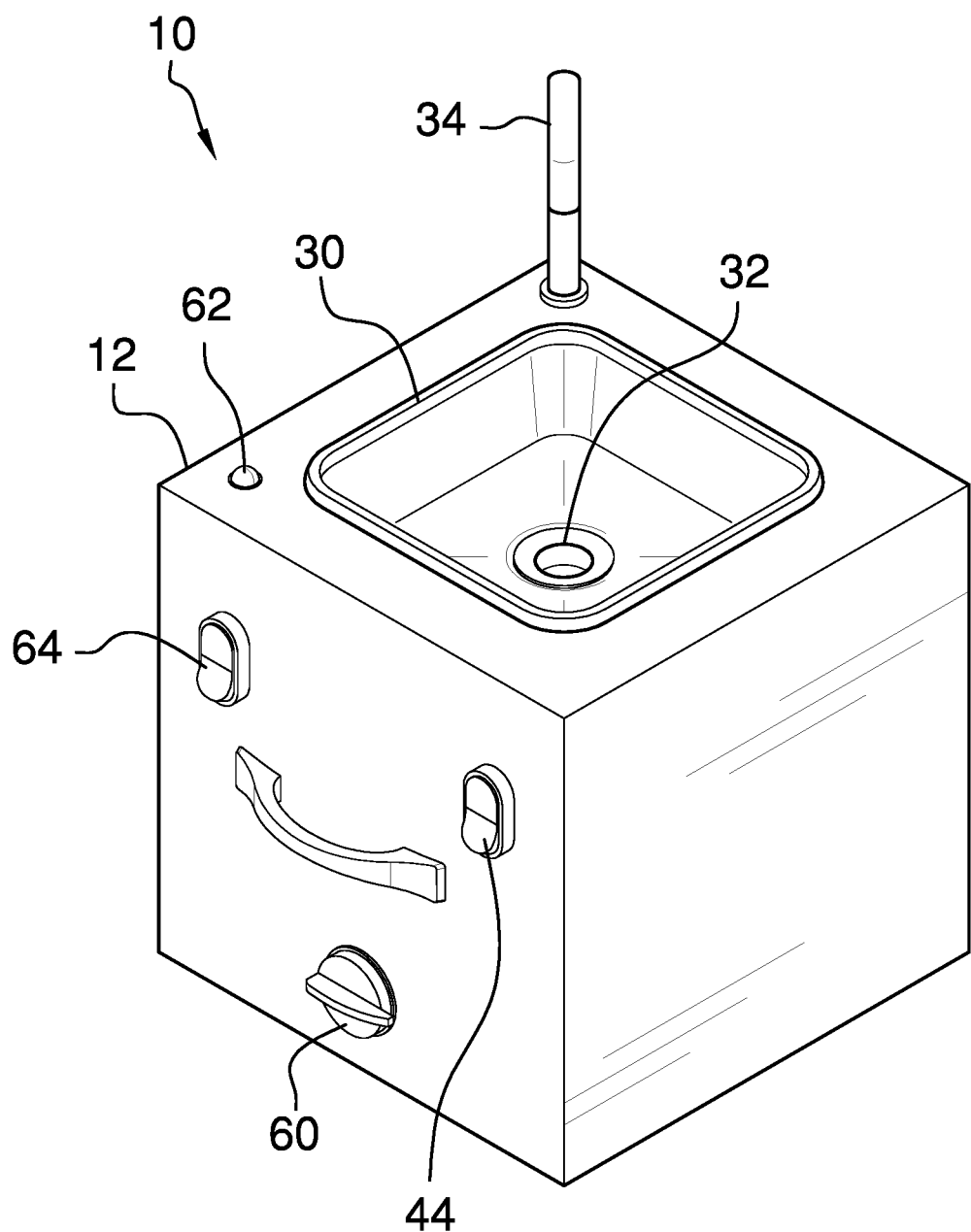
FIG. 1 is a top perspective view of a portable sink assembly according to an embodiment of the disclosure.
Figure 2:
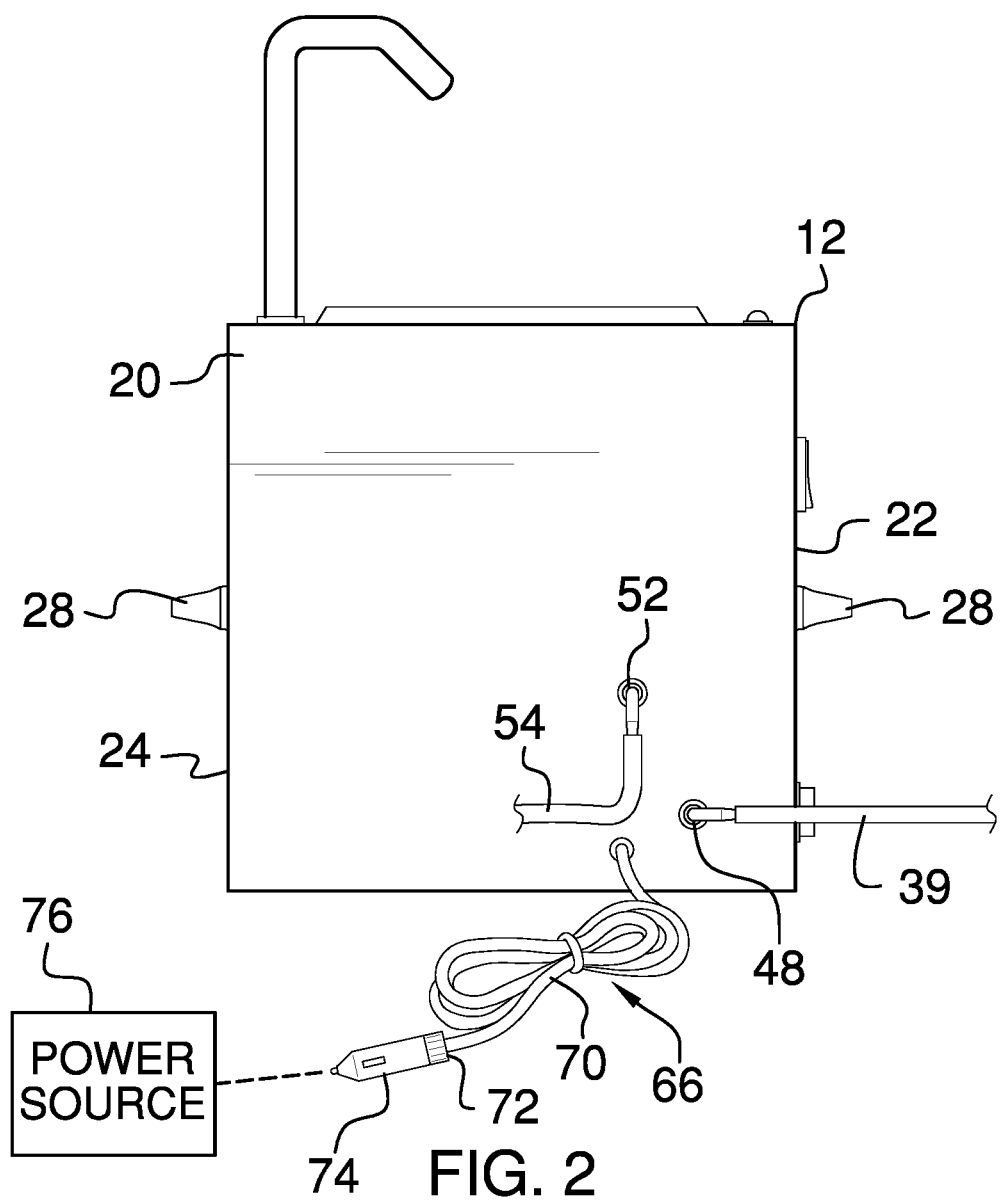
FIG. 2 is a right side view of an embodiment of the disclosure.
Figure 3:
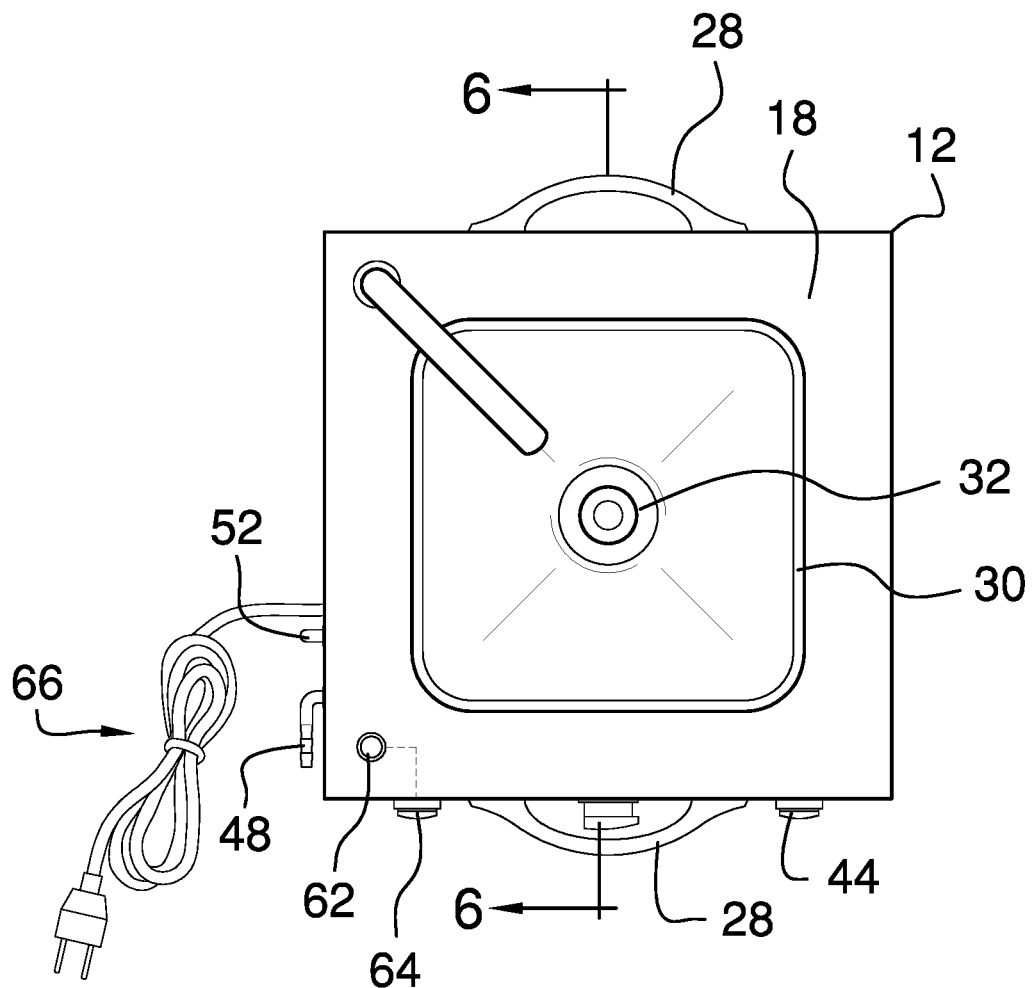
FIG. 3 is a top view of an embodiment of the disclosure.
Figure 4:
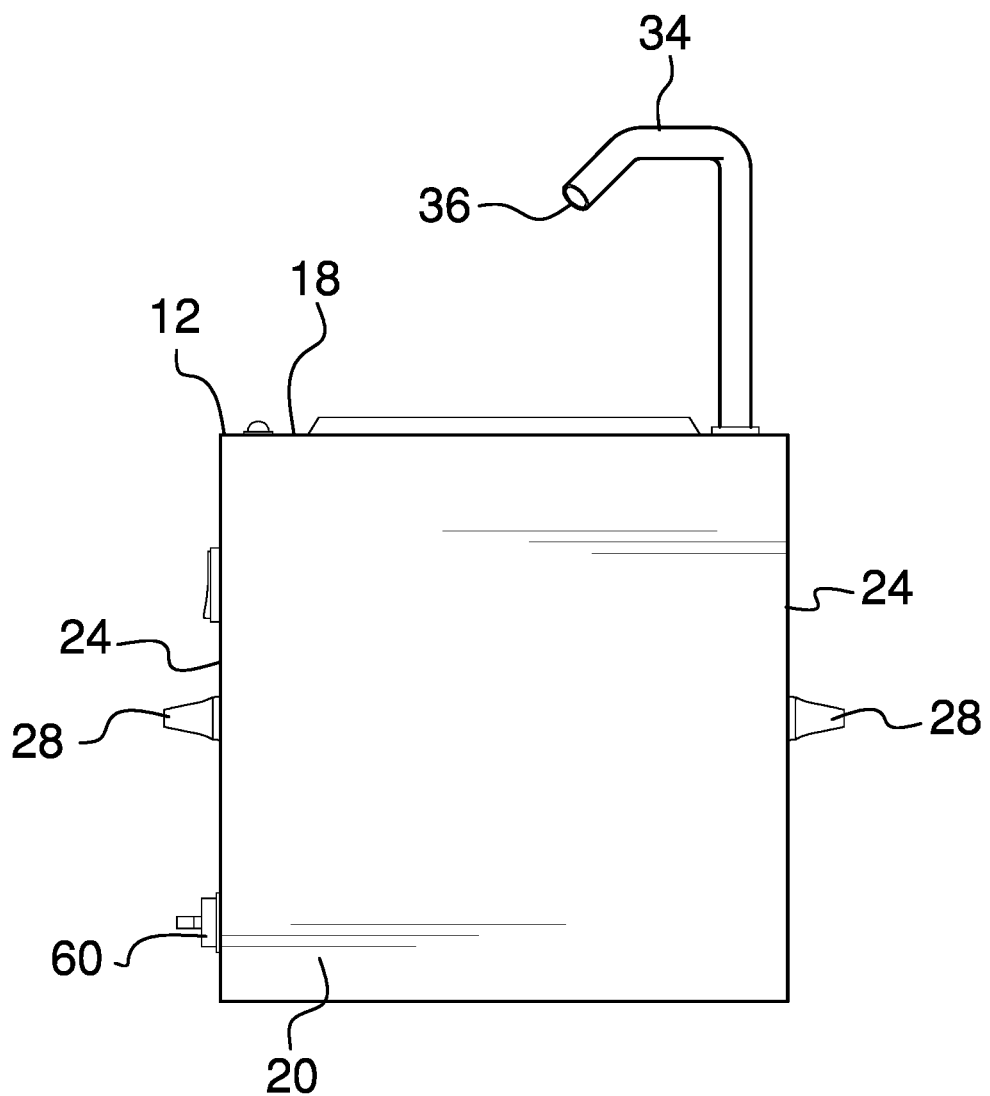
FIG. 4 is a left side view of an embodiment of the disclosure.
Figure 5:
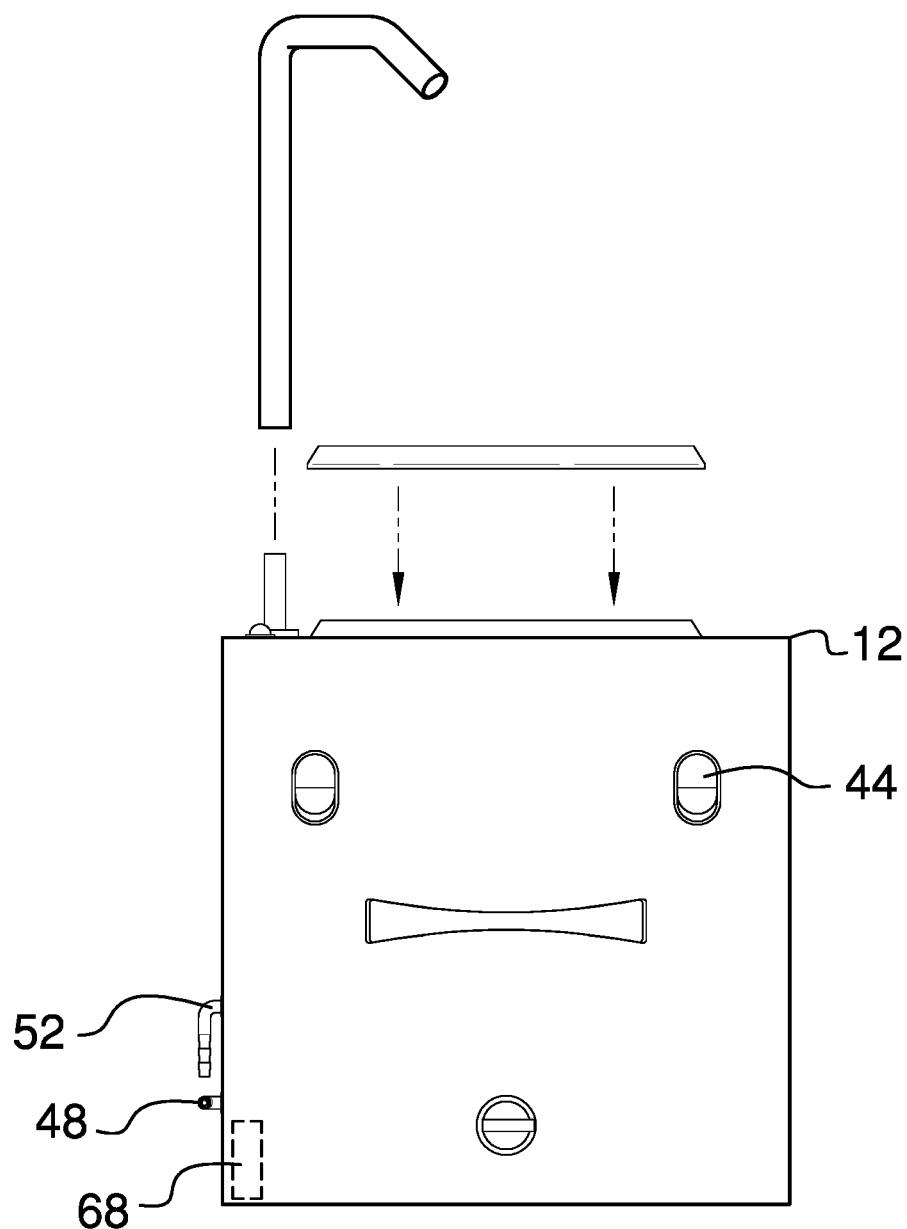
FIG. 5 is a right side exploded view of an embodiment of the disclosure.
Figure 6:
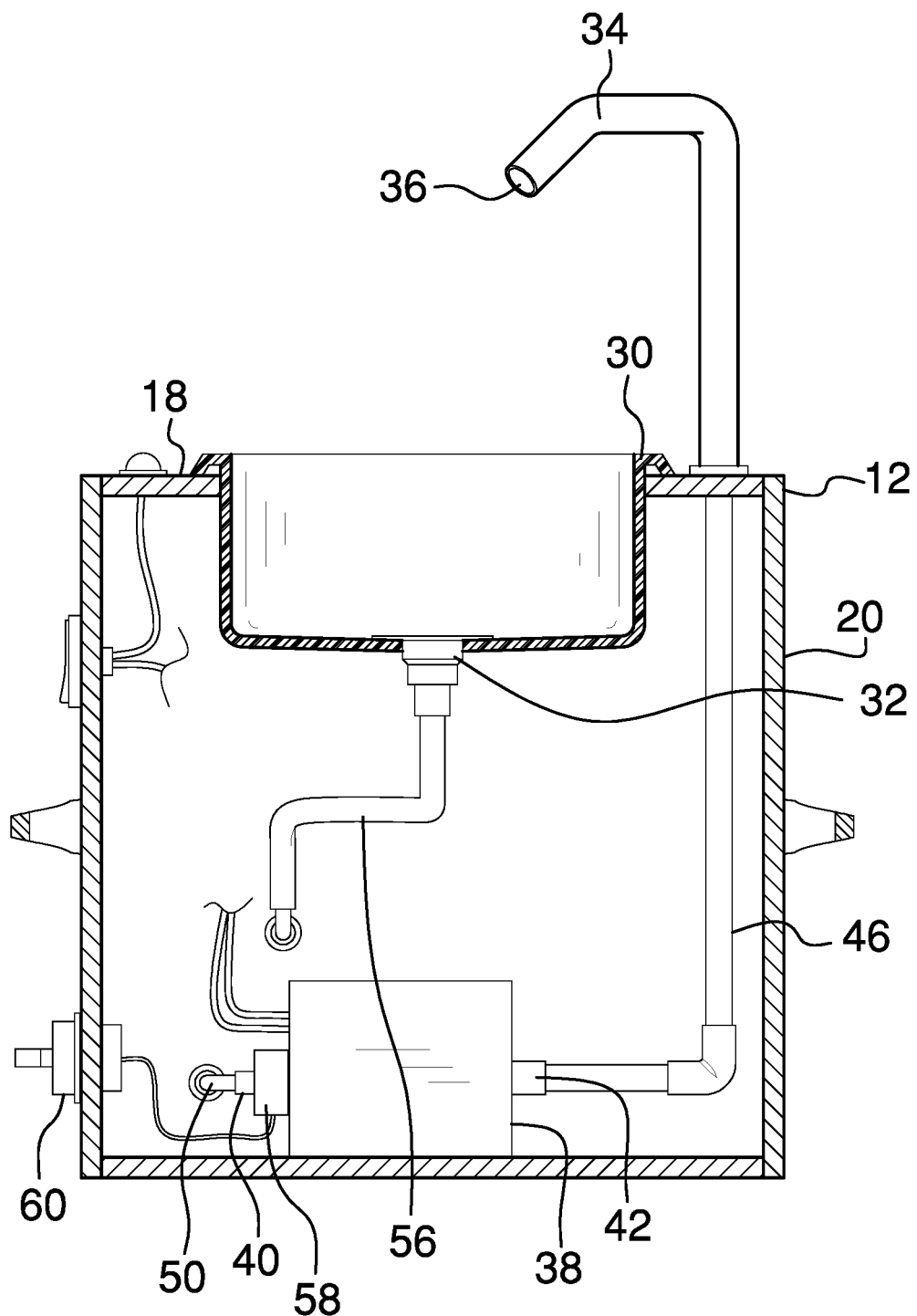
FIG. 6 is a cross sectional view taken along line 6-6 of FIG. 3 of an embodiment of the disclosure.

With reference now to the drawings, and in particular to FIGS. 1 through 7 thereof, a new sink device embodying the principles and concepts of an embodiment of the disclosure and generally designated by the reference numeral 10 will be described.

As best illustrated in FIGS. 1 through 7, the portable sink assembly 10 generally comprises a cube 12 that is positionable in a sleeper 14 of a semi tractor 16 to be accessible to a driver. The cube 12 has a top wall 18 and an outer wall 20, and the outer wall 20 has a front side 22, a back side 24 and a first lateral side 26. A pair of handles 28 is each coupled to the cube 12 for carrying the cube 12. Each of the handles 28 is positioned on the outer wall 20 and each of the handles 28 may be positioned on a respective front side 22 or back side 24 of the outer wall 20.

A sink 30 is recessed into the cube 12 to contain water and the sink 30 is positioned on the top wall 18 of the cube 12. The sink 30 has a drain 32 to pass the water outwardly therethrough for draining the sink 30. A faucet 34 is removably coupled to the cube 12 and the faucet 34 is directed into the sink 30 to direct the water into the sink 30. The faucet 34 extends upwardly from the top wall 18 of the cube 12, the faucet 34 has a distal end 36 that is open and the distal end 36 is directed toward the sink 30. As is most clearly shown in FIG. 5, the faucet 34 may comprise a spigot that extends upwardly from the cube 12 and a tube that removably engages the spigot.

A pump 38 is positioned in the cube 12 and the pump 38 is fluidly coupled to a water source 39. The water source 39 may be a water tank on the semi tractor 16, a bottle of water or any other water source that is carried on the semi tractor 16. The pump 38 is in fluid communication with the faucet 34 for pumping the water to the faucet 34. The pump 38 has an input 40 and an output 42, and the pump 38 may comprise an electric fluid pump or the like. A pump switch 44 is movably coupled to the cube 12, the pump switch 44 is electrically coupled to the pump 38 and the pump switch 44 turns the pump 38 on and off.

An output line 46 is fluidly coupled between the output 42 of the pump 38 and the faucet 34 to deliver the water to the faucet 34. An input port 48 is coupled to the cube 12, the input port 48 is fluidly coupled to the water source 39 and the input port 48 is positioned on the outer wall 20 of the cube 12. An input line 50 is fluidly coupled between the input port 48 and the input 40 of the pump 38 to deliver the water to the input 40 of the pump 38. An output port 52 is coupled to the cube 12 and the output port 52 is positioned on the outer wall 20 of the cube 12. The output port 52 is fluidly coupled to a drain line 54 on the semi tractor 16. An output line 56 is fluidly coupled between the output port 52 and the drain 32 to deliver water from the drain 32 to the drain line 54 on the semi tractor 16. In this way the water is drained from the semi tractor 16.

A valve 58 is provided and the valve 58 is coupled to the pump 38. The valve 58 is actuatable between a minimum flow rate and a maximum flow rate to adjust the volume of water delivered to the pump 38 between a minimum amount and a maximum amount. In this way the flow rate of the faucet 34 can be adjusted. The valve 58 is in fluid communication with the input 40 of the pump 38 and the valve 58 may comprise an electrically controlled fluid valve or the like. A knob 60 is rotatably coupled to the cube 12 and the knob 60 can be manipulated by the driver. The knob 60 is in communication with the valve 58 for adjusting the valve 58 between the minimum flow rate and the maximum flow rate.

A light emitter 62 is coupled to the cube 12 to emit light onto the cube 12 for enhancing visibility of the cube 12 at night. A light switch 64 is movably coupled to the cube 12, the light switch 64 is electrically coupled to the light emitter 62 and the light switch 64 turns the light emitter 62 on and off. The light emitter 62 may comprise an LED or other type of electronic light emitter 62.

A power supply 66 is integrated into the cube 12 and the power supply 66 is electrically coupled to the pump switch 44 and the light switch 64. The power supply 66 comprises at least one battery 68 that is removably positioned in the cube 12. The at least one battery 68 is electrically coupled to the pump switch 44 and the light switch 64. The power supply 66 includes a power cord 70 that is coupled to and extends away from the cube 12. The power cord 70 is electrically coupled to the pump switch 44 and the light switch 64, and the power cord 70 has a distal end 72 with respect to the cube 12. A power plug 74 is electrically coupled to the distal end 72 of the power cord 70 and the power plug 74 can be electrically coupled to a power source 76 comprising a cigarette lighter in the semi tractor 16.

In use, the input port 48 is fluidly coupled to the water source 39 and the output port 52 is fluidly coupled to the drain line 54. The pump switch 44 is turned on to turn on the pump 38 for pumping water outwardly through the faucet 34. The knob 60 is rotated to adjust the flow rate of the water through the faucet 34. In this way the driver has access to running water in the sleeper 14 of the semi tractor 16. The light switch 64 is turned on the turn on the light emitter 62 at night to facilitate the driver to use the faucet 34 at night.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A portable sink assembly for facilitating running water in a sleeper of a semi tractor, said assembly comprising:
    a cube being positionable in a sleeper of a semi tractor wherein said cube is configured to be accessible to a driver;
    a pair of handles, each of said handles being coupled to said cube for carrying said cube;
    a sink being recessed into said cube wherein said sink is configured to contain water;
    a faucet being removably coupled to said cube, said faucet being directed into said sink wherein said faucet is configured to direct the water into said sink;
    a pump being positioned in said cube wherein said pump is configured to be fluidly coupled to a water source, said pump being in fluid communication with said faucet wherein said pump is configured to pump the water to said faucet; and
    a valve being coupled to said pump, said valve being actuatable between a minimum flow rate and a maximum flow rate wherein said valve is configured to adjust the volume of water delivered to said pump between a minimum amount and a maximum amount thereby facilitating the flow rate of said faucet to be adjusted.

2. The assembly according to claim 1, wherein:
    said cube has a top wall and an outer wall; and
    said sink is positioned on said top wall of said cube, said sink having a drain wherein said drain is configured to pass the water outwardly therethrough for draining said sink.

3. The assembly according to claim 1, wherein:
    said pump has an input and an output; and
    said assembly includes an output line being fluidly coupled between said output of said pump and said faucet wherein said output line is configured to deliver the water to said faucet.

4. The assembly according to claim 3, further comprising:
    an input port being coupled to said cube wherein said input port is configured to be fluidly coupled to the water source, said input port being positioned on said outer wall of said cube and
    an input line being fluidly coupled between said input port and said input of said pump wherein said input line is configured to deliver the water to said input of said pump.

5. The assembly according to claim 1, further comprising:
   an output port being coupled to said cube, said output port being positioned on said outer wall of said cube, said output port being fluidly coupled to a drain line on the semi tractor; and
   an output line being fluidly coupled between said output port and said drain wherein said output line is configured to deliver water from said drain to the drain line on the semi tractor for draining the water from the semi tractor.

6. The assembly according to claim 1, further comprising a knob being rotatably coupled to said cube wherein said knob is configured to be manipulated by the driver, said knob being in communication with said valve for adjusting said valve between said minimum flow rate and said maximum flow rate.

7. The assembly according to claim 1, further comprising a pump switch being movably coupled to said cube, said pump switch being electrically coupled to said pump, said pump switch turning said pump on and off.

8. The assembly according to claim 1, further comprising a light emitter being coupled to said cube wherein said light emitter is configured to emit light onto said cube for enhancing visibility of said cube at night.

9. The assembly according to claim 8, further comprising a light switch being movably coupled to said cube, said light switch being electrically coupled to said light emitter, said light switch turning said light emitter on and off.

10. The assembly according to claim 9, further comprising:
    a pump switch being coupled to said cube; and
    a power supply being integrated into said cube, said power supply being electrically coupled to said pump switch and said light switch, said power supply comprising:
       at least one battery being removably positioned in said cube, said at least one battery being electrically coupled to said pump switch and said light switch; and
       a power cord being coupled to and extending away from said cube, said power cord being electrically coupled to said pump switch and said light switch, said power cord having a distal end with respect to said cube, said distal end having a power plug being electrically coupled thereto wherein said power plug is configured to be electrically coupled to a power source comprising a cigarette lighter in the semi tractor.

11. A portable sink assembly for facilitating running water in a sleeper of a semi tractor, said assembly comprising:
    a cube being positionable in a sleeper of a semi tractor wherein said cube is configured to be accessible to a driver, said cube having a top wall and an outer wall;
    a pair of handles, each of said handles being coupled to said cube for carrying said cube, each of said handles being positioned on said outer wall;
    a sink being recessed into said cube wherein said sink is configured to contain water, said sink being positioned on said top wall of said cube, said sink having a drain wherein said drain is configured to pass the water outwardly therethrough for draining said sink;
    a faucet being removably coupled to said cube, said faucet being directed into said sink wherein said faucet is configured to direct the water into said sink, said faucet extending upwardly from said top wall of said cube, said faucet having a distal end being open, said distal end being directed toward said sink;
    a pump being positioned in said cube wherein said pump is configured to be fluidly coupled to a water source, said pump being in fluid communication with said faucet wherein said pump is configured to pump the water to said faucet, said pump having an input and an output;
    an output line being fluidly coupled between said output of said pump and said faucet wherein said output line is configured to deliver the water to said faucet;
    an input port being coupled to said cube wherein said input port is configured to be fluidly coupled to the water source, said input port being positioned on said outer wall of said cube;
    an input line being fluidly coupled between said input port and said input of said pump wherein said input line is configured to deliver the water to said input of said pump;
    an output port being coupled to said cube, said output port being positioned on said outer wall of said cube, said output port being fluidly coupled to a drain line on the semi tractor;
    an output line being fluidly coupled between said output port and said drain wherein said output line is configured to deliver water from said drain to the drain line on the semi tractor for draining the water from the semi tractor;
    a valve being coupled to said pump, said valve being actuatable between a minimum flow rate and a maximum flow rate wherein said valve is configured to adjust the volume of water delivered to said pump between a minimum amount and a maximum amount thereby facilitating the flow rate of said faucet to be adjusted, said valve being in fluid communication with said input of said pump;
    a knob being rotatably coupled to said cube wherein said knob is configured to be manipulated by the driver, said knob being in communication with said valve for adjusting said valve between said minimum flow rate and said maximum flow rate;
    a pump switch being movably coupled to said cube, said pump switch being electrically coupled to said pump, said pump switch turning said pump on and off;
    a light emitter being coupled to said cube wherein said light emitter is configured to emit light onto said cube for enhancing visibility of said cube at night;
    a light switch being movably coupled to said cube, said light switch being electrically coupled to said light emitter, said light switch turning said light emitter on and off; and
    a power supply being integrated into said cube, said power supply being electrically coupled to said pump switch and said light switch, said power supply comprising:
       at least one battery being removably positioned in said cube, said at least one battery being electrically coupled to said pump switch and said light switch; and
       a power cord being coupled to and extending away from said cube, said power cord being electrically coupled to said pump switch and said light switch, said power cord having a distal end with respect to said cube, said distal end having a power plug being electrically coupled thereto wherein said power plug is configured to be electrically coupled to a power source comprising a cigarette lighter in the semi tractor.

12. A portable sink system for facilitating running water in a sleeper of a semi tractor, said assembly comprising:
- a semi tractor having a sleeper;
- a cube being positionable in said sleeper of said semi tractor wherein said cube is configured to be accessible to a driver, said cube having a top wall and an outer wall, said outer wall having a front side, a back side and a first lateral side;
- a pair of handles, each of said handles being coupled to said cube for carrying said cube, each of said handles being positioned on said outer wall, each of said handles being positioned on a respective front side or back side of said outer wall;
- a sink being recessed into said cube wherein said sink is configured to contain water, said sink being positioned on said top wall of said cube, said sink having a drain wherein said drain is configured to pass the water outwardly therethrough for draining said sink;
- a faucet being removably coupled to said cube, said faucet being directed into said sink wherein said faucet is configured to direct the water into said sink, said faucet extending upwardly from said top wall of said cube, said faucet having a distal end being open, said distal end being directed toward said sink;
- a pump being positioned in said cube wherein said pump is configured to be fluidly coupled to a water source, said pump being in fluid communication with said faucet wherein said pump is configured to pump the water to said faucet, said pump having an input and an output;
- an output line being fluidly coupled between said output of said pump and said faucet wherein said output line is configured to deliver the water to said faucet;
- an input port being coupled to said cube wherein said input port is configured to be fluidly coupled to the water source, said input port being positioned on said outer wall of said cube;
- an input line being fluidly coupled between said input port and said input of said pump wherein said input line is configured to deliver the water to said input of said pump;
- an output port being coupled to said cube, said output port being positioned on said outer wall of said cube, said output port being fluidly coupled to a drain port on said semi tractor;
- an output line being fluidly coupled between said output port and said drain wherein said output line is configured to deliver water from said drain to said drain port on said semi tractor for draining the water from said semi tractor;
- a valve being coupled to said pump, said valve being actuatable between a minimum flow rate and a maximum flow rate wherein said valve is configured to adjust the volume of water delivered to said pump between a minimum amount and a maximum amount thereby facilitating the flow rate of said faucet to be adjusted, said valve being in fluid communication with said input of said pump;
- a knob being rotatably coupled to said cube wherein said knob is configured to be manipulated by the driver, said knob being in communication with said valve for adjusting said valve between said minimum flow rate and said maximum flow rate;
- a pump switch being movably coupled to said cube, said pump switch being electrically coupled to said pump, said pump switch turning said pump on and off;
- a light emitter being coupled to said cube wherein said light emitter is configured to emit light onto said cube for enhancing visibility of said cube at night;
- a light switch being movably coupled to said cube, said light switch being electrically coupled to said light emitter, said light switch turning said light emitter on and off; and
- a power supply being integrated into said cube, said power supply being electrically coupled to said pump switch and said light switch, said power supply comprising:
  - at least one battery being removably positioned in said cube, said at least one battery being electrically coupled to said pump switch and said light switch; and
  - a power cord being coupled to and extending away from said cube, said power cord being electrically coupled to said pump switch and said light switch, said power cord having a distal end with respect to said cube, said distal end having a power plug being electrically coupled thereto wherein said power plug is configured to be electrically coupled to a power source comprising a cigarette lighter in the semi tractor.

* * * * *